United States Patent
Frankel et al.

(10) Patent No.: US 10,965,677 B2
(45) Date of Patent: *Mar. 30, 2021

(54) DATA LEAKAGE AND INFORMATION SECURITY USING ACCESS CONTROL

(71) Applicant: BANK OF AMERICA CORPORATION, Charlotte, NC (US)

(72) Inventors: Yair Frankel, Westfield, NJ (US); Jisoo Lee, Chesterfield, NJ (US); Abdul Rafman Azeez, Watchung, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/600,155

(22) Filed: Oct. 11, 2019

(65) Prior Publication Data

US 2020/0045048 A1    Feb. 6, 2020

Related U.S. Application Data

(63) Continuation of application No. 15/604,946, filed on May 25, 2017, now Pat. No. 10,447,697.

(51) Int. Cl.
*H04L 29/06* (2006.01)

(52) U.S. Cl.
CPC .............. *H04L 63/10* (2013.01); *H04L 63/08* (2013.01); *H04L 63/20* (2013.01)

(58) Field of Classification Search
CPC .......... H04L 63/1416; H04L 63/1408; H04L 63/1441; H04L 63/1458; G06F 21/552
USPC .......................................................... 726/1
See application file for complete search history.

(56) References Cited

U.S. PATENT DOCUMENTS

| | | | |
|---|---|---|---|
| 7,035,910 B1 | 4/2006 | Dutta et al. | |
| 7,904,424 B2 | 3/2011 | Yoshida | |
| 8,132,261 B1 | 3/2012 | Simpson et al. | |
| 8,166,003 B2 | 4/2012 | Friesenhahn et al. | |
| 8,347,349 B1 | 1/2013 | Wilson et al. | |
| 8,407,806 B2 | 3/2013 | Agrawal et al. | |
| 8,868,908 B2 | 10/2014 | MacMillan et al. | |
| 8,997,174 B1 | 3/2015 | Wilson et al. | |
| 9,280,428 B2 | 3/2016 | Ripoll | |
| 2010/0242088 A1* | 9/2010 | Thomas | G06F 21/554 726/3 |
| 2013/0346977 A1* | 12/2013 | Rasmusson | G06F 9/45533 718/1 |
| 2015/0347763 A1 | 12/2015 | Roth et al. | |

* cited by examiner

*Primary Examiner* — Evans Desrosiers
(74) *Attorney, Agent, or Firm* — Michael A. Springs (57) ABSTRACT

A system that includes a first network device in a first network configured to send a file from a plurality of files to a compliance controller in the first network. The compliance controller is configured to determine whether the file satisfies a set of compliance rules and to send the file to the virtual machine in the first network in response to determining that the file satisfies the set of compliance rules. The virtual machine is configured to send the file to a second network device in a second network via a network interface. The network interface is configured to block the first network device from sending the file from the first memory to the second network device in the second network. The network interface is also configured to send the file from the virtual machine to the second network device in the second network.

15 Claims, 3 Drawing Sheets

DATA LEAKAGE AND INFORMATION SECURITY USING ACCESS CONTROL

CROSS-REFERENCE TO RELATED APPLICATIONS

This application is a continuation of U.S. patent application Ser. No. 15/604,946 filed May 25, 2017, by Yair Frankel et al., and entitled "DATA LEAKAGE AND INFORMATION SECURITY USING ACCESS CONTROL," which is incorporated herein by reference.

TECHNICAL FIELD

The present disclosure relates generally to information security, and more specifically to a system using data access control.

BACKGROUND

In a network environment, network devices may be in data communication with other network devices within their network as well as with other network devices in other networks. These network environments allow files to be shared among network devices in different networks. For example, files may be exchanged between a network device in one network and another network device in a different network.

One of the technical challenges that occurs when files are exchanged between network devices in different networks is controlling data leakage and unauthorized access to files. In conventional systems, a user is typically given permission to allow a network device to exchange files with another network device in a different network. Existing systems can only provide all or nothing data access control and are unable to assign partial rights or permission for controlling data access and movement. As result, the user and the network device are given full permission to exchange files with other network devices in other networks. Conventional systems are unable to control or monitor data access and movement once the network device is given full permission.

Without the ability to control or monitor data access and movement the system is vulnerable to having sensitive data leak the network and/or allowing malicious data to enter the network. Thus, it is desirable to provide a solution that provides more flexibility for controlling and monitoring data access and movement when allowing a network device to exchange data with another network device in a different network.

SUMMARY

Conventional systems can only be configured to provide all or nothing and are unable to assign partial rights or permissions for controlling data access and movement. As a result, conventional systems are unable to control or monitor data access and movement once the network device is given full permission. Without the ability to control or monitor data access and movement the system is vulnerable to having sensitive data leak the network and/or allowing malicious data to enter the network.

The system described in the present application provides an unconventional technical solution that allows the system to give permission to a network device to exchange data with a network device in another network, while providing data access control for data that leaves and enters a network. The system provides a technical solution that controls which files are available to a network device. For example, the system uses a compliance controller to monitor and control which files the network device has access to and is able to send to another network device. In another example, the system uses a compliance controller to monitor and control which files the network device is allowed to receive or download. The system provides a mechanism for vetting and screening files to ensure that any files leaving or exiting the network satisfy one or more compliance rules. These features provide a technical solution that overcomes the challenges in conventional systems that are caused by giving a network device full permission or rights to exchange files with network devices in other networks. In contrast to conventional systems, these features allow the system to control or monitor data access and movement even when a network device is allowed to exchange files with other network devices.

In one embodiment, the disclosure includes a system that includes a first network device, a compliance controller, a virtual machine, and a network interface in a first network. The first network device includes a first memory configured to store a plurality of files. The first network device also includes a first processor configured to send a file from the plurality of files to the compliance controller in the first network. The compliance controller includes a second memory configured to store the file from the first network device and a set of compliance rules identifying file restrictions. The compliance controller further includes a second processor configured to determine whether the file satisfies the set of compliance rules and to send the file to the virtual machine in the first network in response to determining that the file satisfies the set of compliance rules. The virtual machine is configured to store the file from the compliance controller and to send the file to a second network device in a second network via the network interface. The network interface is configured to block the first network device from sending the file from the first memory to the second network device in the second network. The network interface is also configured to send the file from the virtual machine to the second network device in the second network.

In another embodiment, the disclosure includes a method that includes sending, by a first network device in a first network, a file to a compliance controller in the first network. The method further includes determining, by the compliance controller, whether the file satisfies a set of compliance rules identifying file restrictions and sending, by the compliance controller, the file to a virtual machine in the first network in response to determining that the file satisfies the set of compliance rules. The method further includes sending, by the virtual machine, the file to a second network node in a second network via a network interface. The network interface is configured to block the first network device from sending the file to the second network device in the second network. The network interface is further configured to send the file from the virtual machine to the second device in the second network.

In yet another embodiment, the disclosure includes a system that includes a network interface, a virtual machine, a compliance controller, and a first network device in a first network. The network interface is configured to block the first network device in the first network from receiving files from a second network device in a second network. The network device is also configured to send a file from the second network device to the virtual machine in the first network. The virtual machine is configured to receive the file from the second network device via the network interface and to send the file to the compliance controller. The compliance controller includes a first memory configured to store the file from the virtual machine and a set of compliance rules identifying file restrictions. The compliance controller further includes a first processor configured to determine whether the file satisfies the set of compliance rules and to send the file to the first network device in response to determining that the file satisfies the set of compliance rules. The first network device includes a second memory configured to store the file from the compliance controller.

In yet another embodiment, the disclosure includes a method that includes receiving, by a virtual machine in a first network, a file from a network device in a second network using a network interface. The network interface is configured to block a network device in the first network from receiving the file from the network device in the second network. The network interface is further configured to send the file from the second device in the second network to the virtual machine. The method further includes determining, by the compliance controller, whether the file satisfies a set of compliance rules identifying file restrictions and sending, by the compliance controller, the file to the network device in the first network in response to determining that the file satisfies the set of compliance rules.

Disclosed herein are various embodiments of a system that provides several technical advantages. For example, the system provides a solution that enhances data security and enables data access control and monitoring when a network device is configured to exchange files with network devices in other networks. The system can monitor and control which files the network device has access to and is able to send to another network device. The system can also monitor and control which files the network device is allowed to receive or download. This technical advantage overcomes the problems associated with giving network devices full permission to exchange files with other network devices. Another technical advantage is enhanced data security and protection against data leakage because the system is able to prevent unauthorized file leaving or entering the network.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Existing network environments allow files to be shared among network devices in different networks. One of the technical challenges that occurs when files are exchanged between network devices in different networks is controlling data leakage and unauthorized access to files. In conventional systems, a user is typically given permission to allow a network device to exchange files with another network device in a different network. Existing systems can only provide all or nothing data access control and are unable to assign partial rights or permission for controlling data access and movement. As result, the user and the network device are given full permission to exchange files with other network devices in other networks. Conventional systems are unable to control or monitor data access and movement once the network device is given full permission. Without the ability to control or monitor data access and movement the system is vulnerable to having sensitive data leak from the network and/or allowing malicious data to enter the network.

Disclosed herein are various embodiments of a system that allows data to be exchanged between two networks, while providing data access control for data that leaves and enters a network. The system provides a technical solution that controls which files are available to send to a device in another network and/or are available to a network device. For example, the system uses a compliance controller to monitor and control which files the network device has access to and which files can be sent to another network device. In another example, the system uses the compliance controller to monitor and control which files the network device is allowed to receive or download. The system provides a mechanism for vetting and screening files to ensure that any files leaving or exiting the network satisfy a set of compliance rules. These features provide a technical solution that overcomes the challenges in conventional systems that are caused by giving a network device full permission or rights to exchange files with network devices in other networks. In contrast to conventional systems, these features allow the system to control or monitor data access and movement even when a network device is allowed to exchange files with other network devices.

Figure 1:
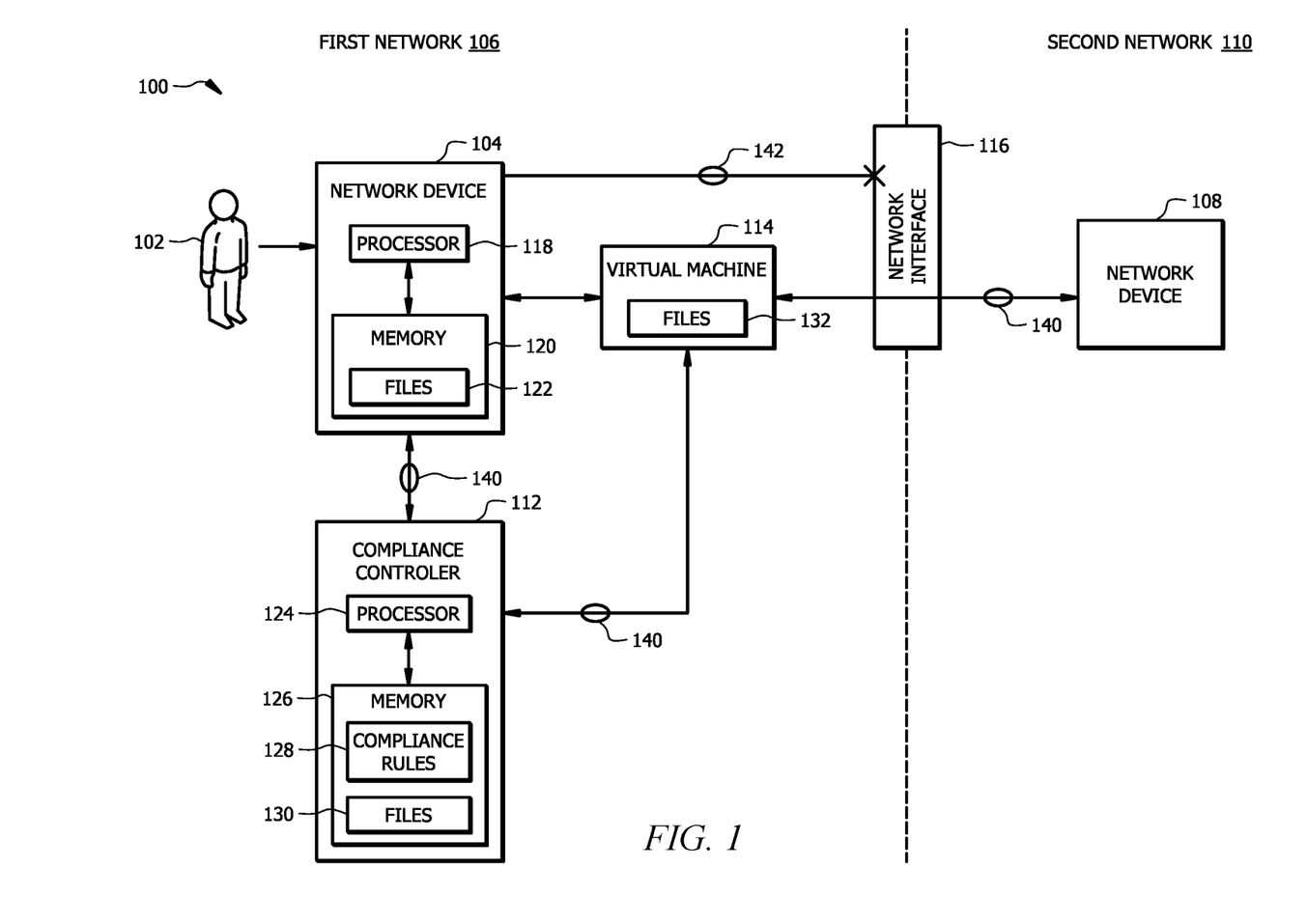
FIG. 1 is a schematic diagram of an embodiment of a system configured to employ data access control for exchanging files with network devices in other networks.

FIG. 1 is a schematic diagram of an embodiment of a system 100 configured to employ data access control for exchanging files with network devices in other networks. In FIG. 1, a user 102 operating a first network device 104 in a first network 106 wants to exchange files with a second network device 108 in a second network 110. For example, the user 102 may want to upload or send files and documents to the second network device 108. As another example, the user 102 may want to download or receive files and documents from the second network device 108.

Examples of the second network device 108 include, but are not limited to, web clients, web servers, user devices, mobile phones, computers, tablet computers, and laptop computers. For instance, the second network device 108 may be a server configured to operate as a database, a file repository, a virtual data or deal room, a file hosting server, or any other suitable file sharing service.

The first network 106 and the second network 110 are any suitable type of wireless and/or wired network including, but not limited to, all or a portion of the Internet, an Intranet, a peer-to-peer network, a public network, a private network, the public switched telephone network, a cellular network, and a satellite network. For example, the first network 106 is a private network or Intranet and the second network 110 is a public domain. The first network 106 and the second network 110 are configured to support any suitable communication protocols as would be appreciated by one of ordinary skill in the art upon viewing this disclosure.

The system 100 comprises the first network device 104, a compliance controller 112, a virtual machine 114, and a network interface 116. System 100 may be configured as shown or in any other suitable configuration.

Examples of the first network device 104 include, but are not limited to, user devices, mobile phones, computers, tablet computers, and laptop computers. The first network device 104 comprises a processor 118 operably coupled to a memory 120. The processor 118 comprises one or more processors operably coupled to the memory 120. The processor 118 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 118 may be a programmable logic device, a microcontroller, a microprocessor, or any suitable combination of the preceding. The processor 118 is communicatively coupled to and in signal communication with the memory 120. The one or more processors are configured to process data and may be implemented in hardware or software. For example, the processor 118 may be 8-bit, 16-bit, 32-bit, 64-bit or of any other suitable architecture. The processor 118 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. Examples of the first network device 104 in operation are described in FIGS. 2 and 3.

The memory 120 comprises one or more disks, tape drives, or solid-state drives, and may be used as an over-flow data storage device, to store programs when such programs are selected for execution, and to store instructions and data that are read during program execution. The memory 120 may be volatile or non-volatile and may comprise read-only memory (ROM), random-access memory (RAM), ternary content-addressable memory (TCAM), dynamic random-access memory (DRAM), and static random-access memory (SRAM). The memory 120 is operable to store an operating system, applications, files 122, and/or any other data or instructions. Examples of files 122 include, but are not limited to, electronic documents, text files, images, video files, music files, and any other suitable type of file. The memory 120 may comprise one or more partitions or segments. Data within each memory segment is isolated from other memory segments. For example, a first memory segment may be allocated to applications for the first network device 104 and a second memory segment may be allocated to applications for the virtual machine 114.

The first network device 104 is generally configured to allow a user 102 to view and access files 122 stored in the memory 120 of the first network device 104. For example, the first network device 104 provides an operating system and various applications that allows the user 102 to access and modify files 122 stored in the memory 120 of the first network device 104.

The first network device 104 is also configured to allow the user 102 to execute or access the virtual machine 114 via the first network device 104. For example, the first network device 104 may provide an application or interface that allows the user 102 to log-in and/or access the virtual machine 114. Files 122 used by the operating system or applications of the first network device 104 cannot be directly transferred to or used by the virtual machine 114. Similarly, files 132 from the virtual machine 114 cannot be directly transferred to or used by the operating system and applications of the first network device 104. For example, files 122 in a first memory segment allocated to applications for the first network device 104 may not be used by the virtual machine 114. Files 132 in a second memory segment allocated to applications for the virtual machine 114 may not be used by the first network device 104. This configuration provides access control by controlling where files can be transferred from and how they can be used.

In one embodiment, the user 102 may request for access to the virtual machine 114 for the first network device 104. For example, in the event that the virtual machine 114 is not installed on or accessible to the first network device 104, the user 102 may request to have access to the virtual machine 114 installed onto the first network device 104. In some embodiments, access to the virtual machine 114 may be removed after a predetermined period of time elapsed. For example, the first network device 104 may be reimaged after a predetermined period of time elapses to remove access to the virtual machine 114. In other examples, providing and/or removing access to the virtual machine 114 may be implemented using any other suitable technique.

Files are transferred between the first network device 104 and the virtual machine 114 using the compliance controller 112. The first network device 104 is configured to exchange (e.g. send and receive) files with the compliance controller 112. For example, the first network device 104 sends files to the compliance controller 112 to be analyzed and sent to the virtual machine 114. The first network device 104 also receives files from the compliance controller 112 after the compliance controller 104 analyzes the files and determines that the files satisfy compliance rules 128. Examples of the first network device 104 and the compliance controller 112 exchanging files are described in FIGS. 2 and 3.

In one embodiment, the system 100 may further comprise a server (not shown) and may be configured to exchange files between the first network device 104 and the compliance controller 112 via the server. Examples of servers include, but are not limited, an email server, a private cloud server, a file repository, a database, a file hosting server, and/or any other suitable type of sever or network device.

In one embodiment, the virtual machine 114 is implemented as an operating system or application (e.g. a web client or browser) on the first network device 104. The virtual machine 114 is configured to share hardware resources (e.g. processor 118 and memory 120) with other operating systems and applications on the first network device 104. Data for the virtual machine 114 is isolated from other operating systems and applications operating on the first network device 104. For example, the files 132 stored in memory allocated for the virtual machine 114 are not accessible to other operating systems and applications running on the first network device 104. Similarly, files 122 stored in memory allocated for the first network device 104 are not accessible to the virtual machine 114.

In another embodiment, the virtual machine 114 is installed and executed from another device and is accessible to the first network device 104 using a network connection. For example, the virtual machine 114 may be installed on a server (not shown) in the first network 106 and the first network device 104 may employ a client (e.g. a web browser) to access the virtual machine 114.

The virtual machine 114 is configured to store files 132 comprising files (e.g. documents) received from the compliance controller 112 and/or from the second network device 108. Files 132 may comprise any combination of files that have or have not satisfied the compliance rules 128. For example, the compliance controller 112 may be configured to send files that have satisfied a set of compliance rules 128 to the virtual machine 114. The virtual machine 114 may also receive files that have not been analyzed by the compliance controller 112 from the second network device 108.

In one embodiment, the user 102 may request a block exemption for the virtual machine 114. For example, the user 102 may provide authentication credentials (e.g. a user name and password) to request a block exemption that allows the virtual machine 114 to communicate with devices the second network 110.

The virtual machine 114 is configured to authenticate a user 102 before allowing the user 102 to access the virtual machine 114 via the first network device 104. For example, upon executing the virtual machine 114, the virtual machine 114 may prompt the user 102 for authentication credentials (e.g. a user name and password). The virtual machine 114 may employ any suitable authentication technique or protocol as would be appreciated by one of ordinary skill in the art upon viewing this disclosure. The virtual machine 114 is configured to allow the user 102 to access the virtual machine 114 and files 132 within the memory allocated to the virtual machine 114 in response to authenticating the user 102. The virtual machine 114 is configured to prevent unauthorized users from accessing the virtual machine 114 and files 132 within the virtual machine 114. This authentication process allows the virtual machine 114 to provide data control access for files 132 that can be sent to and/or received from network devices in the second network 110.

The virtual machine 114 is generally configured to exchange files between the first network 106 and the second network 110 (e.g. a public network or domain). For example, the virtual machine 114 is configured to receive files 140 from the compliance controller 112 that satisfy a set of compliance rules 128 and to send the files 140 to the second network device 108 in the second network 110. In another example, the virtual machine 114 is configured to receive a file 140 from the second network device 108 and to send the file 140 to the first network device 104 via the compliance controller 112. The compliance controller 112 sends the file 140 to the first network device 104 in response to determining the files 140 satisfy a set of compliance rules 128. In another example, the virtual machine 114 is configured to receive a file 140 from the second network device 108 and to allow a user 102 to access or view the file 140 via the virtual machine 114. For instance, the user 102 may log into the virtual machine 114 using the first network device 104. Examples of the virtual machine 114 in operation are described in FIGS. 2 and 3.

Examples of the compliance controller 112 include, but are not limited to, web clients, web servers, user devices, mobile phones, computers, tablet computers, and laptop computers. The compliance controller 112 comprises a processor 124 operably coupled to a memory 126. In one embodiment, the processor 124 and the memory 126 are configured similar to the processor 118 and the memory 120 of the first network device 104, respectively.

The memory 126 is operable to store compliance rules 128, files 130, and/or any other data or instructions. In one embodiment, the compliance rules 128 comprise one or more rules or sets of rules identifying file restrictions. For example, the compliance rules 128 may comprise rules identifying restricted types of information. Examples of restricted types of information include, but are not limited to, personal information, financial information, social security information, health information, confidential information, names, phone numbers, addresses, and/or any other type of information, or combinations thereof. In one embodiment, the compliance controller 112 is configured to modify a file or document to redact the restricted types of information in response to determining that the file or document comprises the restricted types of information.

As another example, the compliance rules 128 comprise a rule identifying a file size limitation. The file size limitation indicates a maximum allowed file size that can be exchanged between the first network device 104 and the second network device 108. As another example, the compliance rules 128 comprise a rule identifying a restricted file type. Restricted file types are file types that are prohibited from being exchanged between the network device 104 and the network device 108.

In another embodiment, the compliance rules 128 comprise rules for product (e.g. software product) testing and development. For example, the compliance rules 128 comprise a rule identifying a particular program functionality, a particular program format or language, and/or any other requirements for files that can be exchanged between the first network device 104 and the second network device 108. In this examples, only files that have the specified functionality, format, and/or language may be exchanged between the first network device 104 and the second network device 108. In other examples, the compliance rules 128 may comprise any other suitable type rules and/or restrictions as would be appreciated by one of ordinary skill in the art.

Files 130 comprise files and documents received from the first network device 104 (e.g. files 122) and/or from the virtual machine 114 (e.g. files 136). Files 130 may comprise any combination of files that have or have not satisfied the compliance rules 128.

The compliance controller 112 is generally configured to exchange files between the first network device 104 and the virtual machine 114 that satisfies a set of compliance rules 128. For example, the compliance controller 112 is configured to receive a file 140 from the first network device 104, to determine whether the file 140 satisfy a set of compliance rules 128, and to send the file 140 or make the file 140 available to the virtual machine 114 when the file 140 satisfies the set of compliance rules 128. As another example, the compliance controller 112 is configured to receive a file 140 from the virtual machine 114, to determine whether the file 140 satisfy a set of compliance rules 128, and to send the file 140 or make the file 140 available to the first network device 104 when the file 140 satisfies the set of compliance rules 128. The compliance controller 112 may be configured to operate autonomously or may be operated manually by a user to determine whether the file 140 satisfies the set of compliance rules 128. Examples of the compliance controller 112 in operation are described in FIGS. 2 and 3.

The network interface 116 is configured to enable wired and/or wireless communications. The network interface 116 is configured to communicate data among the first network 106, the second network 110, and/or any other network or domain. For example, the network interface 116 may be configured for communication with a modem, a switch, a router, a bridge, a server, or a client.

The network interface 116 is generally configured to control the flow of data between network devices in the first network 106 and the second network 110. For example, the network interface 116 is configured to establish and utilize a network connection between the virtual machine 114 and the second network device 108. The network interface 116 is configured to support any suitable communication protocols as would be appreciated by one of ordinary skill in the art upon viewing this disclosure.

In one embodiment, the network interface 116 is configured to block the first network device 104 from sending files from memory outside of the memory allocated to applications for the first network device 104 to network devices in other networks. For example, the network interface 116 is configured to block or prevent the first network device 104 from sending files 142 to the second network device 108 in the second network 110. The network interface 116 is also configured to block the first network device 104 from receiving files from network devices in other networks. For example, the network interface 116 is configured to prevent the first network device from receiving devices from the second network device 108 in the second network.

The network interface 116 is configured to allow the virtual machine 114 to send and receive files 140 from network devices in other networks. For example, the network interface 116 is configured to allow the virtual machine 114 to send files from memory allocated to the virtual machine 114. As another example, the network interface 116 is configured to receive files 140 from the second network device 108 in the second network 110. The network interface 116 controls data flow and leakage by limiting how data can exchanged with devices in another network.

Figure 2:
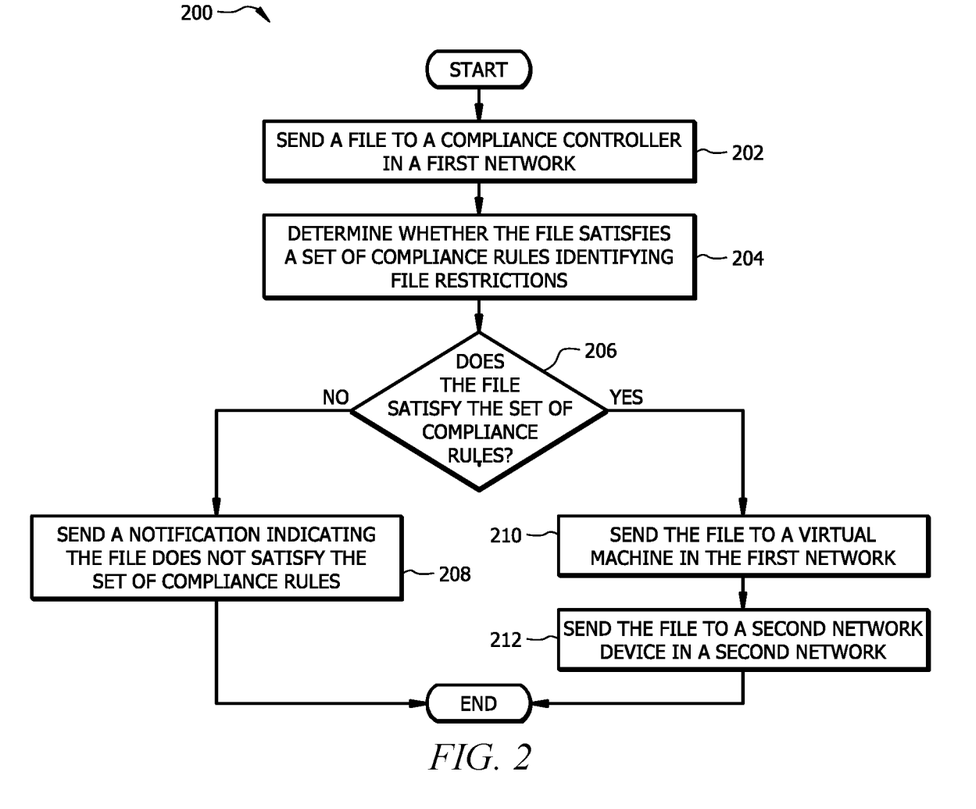
FIG. 2 is a flowchart of an embodiment of a data access control method for sending files.

FIG. 2 is a flowchart of an embodiment of a data access control method 200 for sending files. Method 200 may be performed by the system 100 when a first network device 104 wants to send a file to a second network device 108 in another network (e.g. network 110). As a non-limiting example, a user 102 employing the first network device 104 may want to upload a file (e.g. a contract) to a file hosting service operating on the second network device 108 in the second network 110.

At step 202, the first network node 104 sends the file 140 to the compliance controller 112 in the first network 106. In one embodiment, the first network device 104 sends the file 140 to the compliance controller 112. For example, the first network device 104 may send file 140 to the compliance controller 112 via email or using a file transfer protocol (FTP) connection. As another example, the first network device 104 may send the file 140 to the compliance controller 112 using a cable connection (e.g. firewire), a flash drive, or any other file exchanging hardware.

In another embodiment, the first network device 104 sends the file 140 to the compliance controller 112 via a server. For example, the server may be part of a database, a file repository or private cloud within the first network 106. The first network device 104 may send or upload the file 140 to the server. The compliance controller 112 can then later download or access the file 140 from the server. In one embodiment, the server may be configured to forward the file 140 to the compliance controller 112.

At step 204, the compliance controller 112 determines whether the file satisfies a set of compliance rules 128. In one embodiment, the set of compliance rules 128 may comprise rules that identify different types of file limitations or restrictions. For example, the set of compliance rules 128 may comprise rules identifying restricted types of information, file size limitations, restricted file types, and/or any other types of file limitations or restrictions. The compliance controller 112 may compare the attributes of the file 140 to determine whether the file 140 satisfies the set of compliance rules 128.

For example, the set of compliance rules 128 may identify a file size limitation. The compliance controller 112 may compare the size of the file 140 to the file size limit to determine whether the file 140 satisfies the set of compliance rules 128. The compliance controller 120 may determine that the file satisfies the compliance rules 128 when the size the file 140 is less than or equal to the file size limit.

As another example, the set of compliance rules 128 may identify a restricted file type. The compliance controller 112 may determine the file type of the file 140 and compare the file type of the file 140 to the restricted file type to determine whether the file 140 satisfies the compliance rules 128. The compliance controller 120 may determine that the file satisfies the compliance rules 128 when the file type of the file 140 does not match the restricted file type.

As another example, the set of compliance rules 128 may identify restricted types of information. The compliance controller 112 may determine whether the file 140 comprises the restricted information. For instance, the restricted types of information may comprise personal information such as names, addresses, and social security numbers. The compliance controller 112 may examine the contents (e.g. the text) of the file 140 to determine whether file 140 comprises any of the restricted types of information. In one embodiment, the compliance controller 112 may be configured to redact or mask any identified restricted types of information. For instance, the compliance controller 112 may be configured to scramble or obfuscate text within the file 140 that corresponds with the restricted types of information.

At step 206, the compliance controller 112 proceeds to step 208 when the compliance controller 112 determines that the file 140 does not satisfy the set of compliance rules 128. The compliance controller 112 proceeds to step 210 when the compliance controller 112 determines that the file 140 satisfies the set of compliance rules 128.

At step 208, the compliance controller 112 sends a notification indicating the file 140 does not satisfy the set of compliance rules 128. For example, the compliance controller 112 may send an alert or notification (e.g. an email) to the first network device 104 indicating the file 140 does not satisfy the set of compliance rules 128. The notification may identify the file 140, failed compliance rules 128, and/or any other suitable information.

Returning to step 206, the compliance controller 112 proceeds to step 210 when the compliance controller 112 determines that the file 140 satisfies the set of compliance rules 128. At step 210, the compliance controller 112 sends the file 140 to the virtual machine 114 in the first network 106. In one embodiment, the compliance controller 112 sends the file 140 to the virtual machine 114.

In another embodiment, the compliance controller 112 sends the file 140 to the virtual machine 114 via a server. For example, the server may be part of a database, a file repository, or private cloud within the first network 106. The compliance controller 112 may send or upload the file 140 to the server. The virtual machine 114 can then later download or access the file 140 from the server. In one embodiment, the compliance controller 112 sends information or a hyperlink identifying where the file 140 can be downloaded from to the virtual machine 114.

At step 212, the virtual machine 114 sends the file 140 to a second network device 108 in a second network 110. For example, a user 102 may access the virtual machine 114 via the first network device 104. In one embodiment, the virtual machine 114 may authenticate the user 102 prior to allow the user 102 to access and send the virtual machine 114. The user 102 may employ the virtual machine 114 to send the file 140 to the second network device 108 in the second network 110. For example, the virtual machine 114 may send the file 140 as an attachment in an email. As another example, the virtual machine 114 may send the file 140 using a peer-to-peer connection or an FTP connection. As another example, the virtual machine 114 may upload the file 140 to an external website operating on the second network device 108. In other examples, the virtual machine 114 may send the file 140 to second network device 108 using any other suitable technique as would be appreciated by one of ordinary skill in the art.

Figure 3:
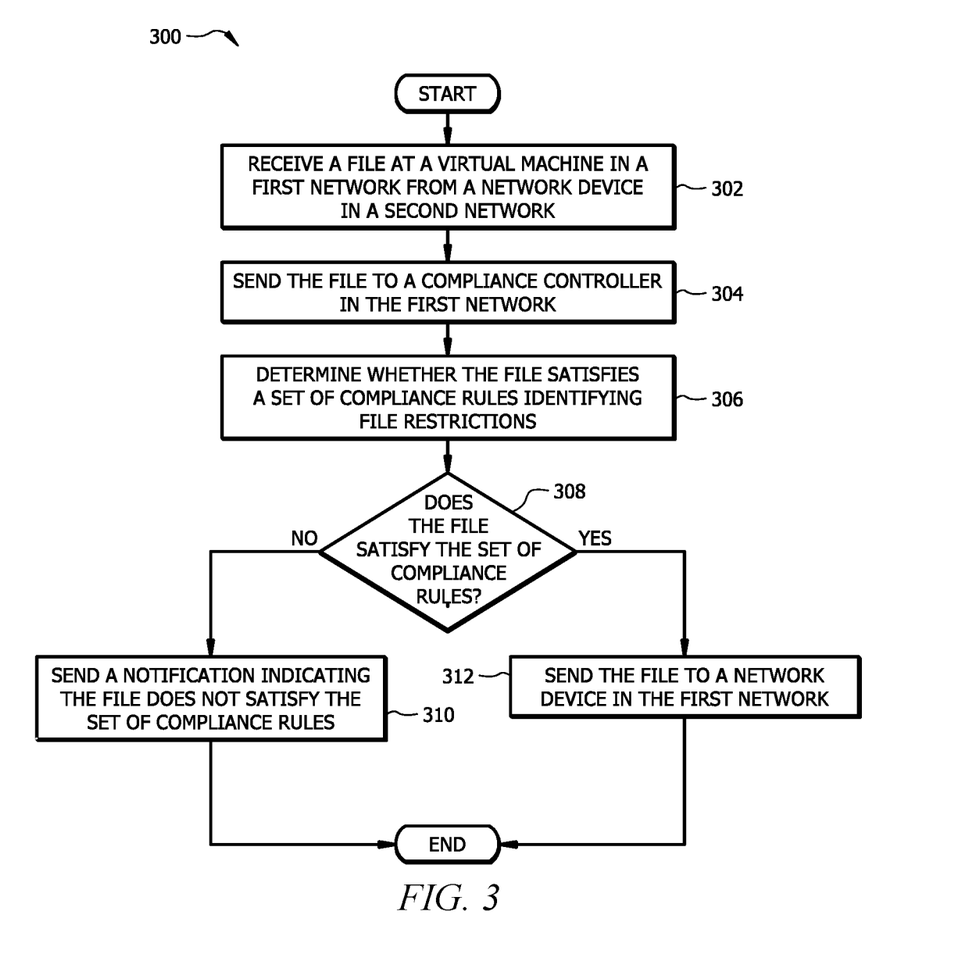
FIG. 3 is a flowchart of an embodiment of a data access control method for receiving files.

FIG. 3 is a flowchart of an embodiment of a data access control method 300 for receiving files. Method 300 may be performed by the system 100 when a first network device 104 waits to access or receive a file sent from a second network node 108 in another network (e.g. network 110). As a non-limiting example, a user 102 employing the first network device 104 may want to download a file (e.g. an audio file) from the second network device 108 in the second network 110.

At step 302, the virtual machine 114 receives the file 140 from the second network device 108 in the second network 110. For example, the second network device 108 may be a server hosting a public web site or providing file hosting services and the virtual machine 114 may download the file 140 from the second network device 108. In other examples, the virtual machine 114 may receive the file 140 from the second network device 108 via email, using an FTP connection, or using any other suitable technique as would be appreciated by one of ordinary skill in the art.

At step 304, the virtual machine 114 sends the file to the compliance controller 112 in the first network 106. In one embodiment, the virtual machine 114 sends the file 140 to the compliance controller 112. For example, a user 102 may access the virtual machine 114 via the first network device 104. In one embodiment, the virtual machine 114 may authenticate the user 102 prior to allow the user 102 to access and send the virtual machine 114. The user 102 may employ the virtual machine 114 to send the file 140 to the compliance controller 112. For example, the virtual machine 114 may send file 140 to the compliance controller 112 via email or using an FTP connection, or any other suitable file exchanging technique.

In another embodiment, the virtual machine 114 sends the file 140 to the compliance controller 112 via a server. For example, the server may be part of a database, a file repository or private cloud within the first network 106. The virtual machine 114 may send or upload the file 140 to the server. The compliance controller 112 can then later download or access the file 140 from the server. In some embodiments, the server may be configured to autonomously forward the file 140 to the compliance controller 112.

At step 306, the compliance controller 112 determines whether the file satisfies a set of compliance rules 128. For example, the compliance controller 112 may determine whether the file 140 satisfies the set of compliance rules 128 using similar to the process similar to the process in step 204 of FIG. 2.

At step 308, the compliance controller 112 proceeds to step 310 when the compliance controller 112 determines that the file 140 does not satisfy the set of compliance rules 128. The compliance controller 112 proceeds to step 312 when the compliance controller 112 determines that the file 140 satisfies the set of compliance rules 128.

At step 310, the compliance controller 112 sends a notification indicating the file does not satisfy the set of compliance rules 128. For example, the compliance controller 112 may send an alert or notification to the virtual machine 114 indicating the file 140 does not satisfy the set of compliance rules 128. The notification may identify the file 140, failed compliance rules 128, and/or any other suitable information.

Returning to step 308, the compliance controller 112 proceeds to step 312 when the compliance controller 112 determines that the file satisfies the set of compliance rules 128. At step 312, the compliance controller 112 sends the file to the first network device 104 in the first network 106. In one embodiment, the compliance controller 112 sends the file 140 to the first network device 104.

In another embodiment, the compliance controller 112 sends the file 140 to the first network device 104 via a server. For example, the server may be part of a database, a file repository, or private cloud within the first network 106. The compliance controller 112 may send or upload the file 140 to the server. The first network device 104 can then later download or access the file 140 from the server. In one embodiment, the compliance controller 112 sends information or a hyperlink identifying where the file 140 can be downloaded from to the first network device 104.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:
1. A system comprising:
  a compliance controller, comprising:
    a memory configured to store:
      a file received from a first network device; and
      a set of compliance rules identifying:
        file restrictions; and
        restricted types of information;
    a processor configured to:
      determine that the file comprises restricted types of information;
      modify the file to redact the restricted types of information in response to determining that the file comprises the restricted types of information;
      determine whether the file satisfies the set of compliance rules; and
      send the file to a virtual machine in the first network in response to determining that the file satisfies the set of compliance rules;
  the virtual machine configured to:
    store the file from the compliance controller; and
    send the file to a second network device in a second network via a network interface; and the network interface configured to:
  block the first network device from sending the file from the first memory to the second network device in the second network; and
  send the file from the virtual machine to the second network device in the second network.

2. The system of claim 1, wherein the virtual machine is configured to authenticate a user before allowing the user access to the virtual machine.

3. The system of claim 1, wherein receiving the file at the compliance controller comprises receiving an email comprising the file.

4. The system of claim 1, wherein:
the set of compliance rules identify restricted types of information, and
determining whether the file satisfies the set of compliance rules comprises determining that the file does not comprise the restricted types of information.

5. The system of claim 1, wherein:
the set of compliance rules identifies a file size limitation, and
determining whether the file satisfies the set of compliance rules comprises determining that the file satisfies the file size limitation.

6. The system of claim 1, wherein:
the set of compliance rules identifies a restricted file type,
the compliance controller is configured to determine a file type for the file, and
determining whether the file satisfies the set of compliance rules comprises determining that the file type does not match the restricted file type.

7. A data access control method comprising:
receiving a file at a compliance controller in a first network;
determining, by the compliance controller, that the file comprises restricted types of information; and
modifying, by the compliance controller, the file to redact the restricted types of information in response to determining that the file comprises the restricted types of information;
determining, by the compliance controller, whether the file satisfies a set of compliance rules identifying file restrictions and restricted types of information;
sending, by the compliance controller, the file to a virtual machine in the first network in response to determining that the file satisfies the set of compliance rules;
blocking, by a network interface, a first network device from sending the file to a second network device in a second network; and
sending, by the virtual machine, the file to the second network device in the second network.

8. The method of claim 7, wherein sending the file to the compliance controller comprises sending an email comprising the file.

9. The method of claim 7, wherein:
the set of compliance rules identify restricted types of information, and
determining whether the file satisfies the set of compliance rules comprises determining that the file does not comprise the restricted types of information.

10. The method of claim 7, wherein:
the set of compliance rules identifies a file size limitation, and
determining whether the file satisfies the set of compliance rules comprises determining that the file satisfies the file size limitation.

11. The method of claim 7, further comprising determining, by the compliance controller, a file type for the file, and wherein:
the set of compliance rules identifies a restricted file type; and
determining whether the file satisfies the set of compliance rules comprises determining that the file type does not match the restricted file type.

12. A system comprising:
a network interface configured to:
  block a first network device in a first network from receiving files from a second network device in a second network;
  send a file from the second network device to a virtual machine in the first network;
the virtual machine in a first network configured to:
  receive the file from the second network device via the network interface; and
  send the file to a compliance controller in the first network;
the compliance controller comprising:
  a first memory configured to store:
    the file from the virtual machine; and
    a set of compliance rules identifying:
      file restrictions; and
      restricted types of information;
  a first processor configured to:
    determine that the file comprises restricted types of information;
    modify the file to redact the restricted types of information in response to determining that the file comprises the restricted types of information;
    determine whether the file satisfies the set of compliance rules; and
    send the file to the first network device in response to determining that the file satisfies the set of compliance rules.

13. The system of claim 12, wherein:
the set of compliance rules identify restricted types of information, and
determining whether the file satisfies the set of compliance rules comprises determining that the file does not comprise the restricted types of information.

14. The system of claim 12, wherein:
the set of compliance rules identifies a file size limitation, and
determining whether the file satisfies the set of compliance rules comprises determining that the file satisfies the file size limitation.

15. The system of claim 12, wherein:
the set of compliance rules identifies a restricted file type,
the compliance controller is configured to determine a file type for the file, and
determining whether the file satisfies the set of compliance rules comprises determining that the file type does not match the restricted file type.

* * * * *